Patented July 23, 1946

2,404,538

UNITED STATES PATENT OFFICE 2,404,538

MANUFACTURE OF ARYLALKENE HYDROCARBONS

Louis Schmerling and Vladimir N. Ipatieff, Riverside, Ill., assignors to Universal Oil Products Company, Chicago, Ill., a corporation of Delaware No Drawing. Application October 29, 1943, Serial No. 508,258

8 Claims. (Cl. 260—669)

This invention is directed to a process for the dehydrohalogenation of aralkyl halides.

More particularly, the present invention relates to a process for the manufacture of arylalkenes by the dehydrohalogenation of aralkyl halides.

The production of arylalkenes by treating aralkyl halides with alkaline reagents to effect dehydrohalogenation has already been disclosed. In such reactions, alkaline reagents may be used either in the liquid or in the solid form. Examples of aqueous solutions which have been employed are the solutions of hydroxides of the alkali metals and, alternatively, alcoholic solutions of these hydroxides. Similarly, the dehydrohalogenation reaction has been brought about by contacting the aralkyl halide with solid granular materials such as the oxides of alkaline earth metals including calcium, strontium, and barium and the reaction has also been brought about by contacting the aralkyl halides with the commercial product known as "soda-lime." These reagents effect the dehydrohalogenation of the aralkyl halides by means of their basic character which enables them to remove the hydrogen halide molecule from the aralkyl halide, leaving the desired arylalkene.

The present process for producing arylalkenes from aralkyl halides differs from previously used processes in the employment of acid media rather than alkaline media and represents a more efficient method in that the hydrogen halides produced by the reaction are recovered in aqueous solution rather than in combination with bases.

Broadly, our invention comprises the dehydrohalogenation of an aralkyl halide in the presence of water or a dilute aqueous solution of an acid-acting hydrolyzable salt.

In one specific embodiment, this invention comprises a process for the dehydrohalogenation of aralkyl halides, the alkyl group of which contains more than one carbon atom, to produce arylalkenes therefrom by contacting the aralkyl halides with a material selected from the group consisting of water, a dilute solution of an acid, and a dilute solution of a hydrolyzable salt of an acid.

The present invention consists in treating an aralkyl halide at elevated temperatures with water or dilute aqueous solutions of acids or acid-acting salts which generate by hydrolysis the small amounts of hydrogen halides necessary to bring about the desired conversion. It is generally preferable to start with dilute solutions of hydrogen halides or acid-acting metal halides rather than with water alone, since the presence of the acid eliminates an induction period corresponding to the formation of the necessary small amounts of acid by the hydrolysis of the aralkyl halide.

Aralkyl halides which may be used in the present process are those in which the alkyl group contains more than one carbon atom. Examples of such compounds include 1-chloro-1-phenylethane, 1-chloro-2-phenylethane, 1-chloro-2-phenylpropane, 1-chloro-2-methyl-2-phenylpropane, etc. Suitable aralkyl chlorides may be conveniently prepared by the condensation of an aromatic hydrocarbon (e. g., benzene) with an unsaturated chloride (e. g., methallyl chloride) in the presence of an acidic catalyst such as sulfuric acid, hydrogen fluoride or phosphoric acid.

In carrying out the invention the aralkyl halide is contacted with the water or dilute solution of acid or acid-acting salt at temperatures within the range of from about 150° to about 350° C., although temperatures of from 200° to about 300° C. are generally most suitable. The process is usually effected under sufficient pressure to prevent volatilization of the aralkyl halide or the aqueous solution and operations may be conducted in either batch or continuous procedure.

In batch operation, a volume of an aralkyl halide is heated in a pressure vessel with from about 1 to about 4 or even larger volumes of water or aqueous solution for a time up to about four hours, depending upon the ease of conversion of the aralkyl halide and the activity of the aqueous solution employed. In continuous operations, the aralkyl halide and the aqueous solution may be mixed and forced through a tubular or baffled reactor at somewhat higher temperatures than are employed in batch operations so that the time necessary for the completion of the reaction is lowered. After the reaction is complete, the products are fractionated to separate the desired arylalkene from the unconverted aralkyl halide and the aqueous solution and unconverted aralkyl halide are returned for retreatment. The acid aqueous solution can be used, if desired, as a source of concentrated hydrohalic acid by, for example, distilling a constant boiling mixture of water and hydrogen halide and adding hydrogen halide.

Among the compounds which may be used in dilute solution for effecting the present type of conversion are mineral acids such as hydrogen chloride, hydrogen bromide, sulfuric acid, phosphoric acid, boric acid and hydrogen fluoride. Among the acid-acting salts which may be used in dilute solution to furnish the necessary small amounts of acid by hydrolysis are the halides and sulfates of such elements as aluminum, zinc, iron and magnesium and ammonium chloride. For the initiation of the desired dehydrohalogenation reactions only dilute solutions of the acids or salts are necessary, usually less than 5 per cent by weight, and frequently only 0.5 per cent by weight.

The present process may be applied to monohaloalkylaromatics or polyhaloalkylaromatics. The amount and concentration of the aqueous solution used, its ratio to the aralkyl halide treated, and the temperature, pressure and time of reaction may be varied somewhat according to the material undergoing treatment.

The following example is introduced to illustrate the process of the invention but should not be construed as limiting the invention in accordance with the data submitted.

24 grams of β-chloro-t-butylbenzene (prepared by the condensation of benzene with methallyl chloride in the presence of sulfuric acid) was heated for four hours with 100 grams of water in a sealed tube at 225° C. The product consisted of a clear yellow upper layer and a water-white aqueous layer. Titration of the latter showed that it contained 5.0 grams of hydrogen chloride; the theoretical amount of hydrogen chloride available from 24 grams of chlorbutylbenzene is 5.05 grams. Distillation of an ether solution of the upper layer gave the following:

[Charge: 28 cc. or 24 g.]

| Cut | B. P., °C. | Vol., cc. | $n_D^{20}$ |
|---|---|---|---|
| A | 34–35 | 7.7 | |
| 1 | 35–176 | 1.3 | |
| 2 | 176–180 | 2.5 | 1.5279 |
| 3 | 180–183 | 4.1 | 1.5331 |
| 4 | 183–185 | 2.9 | 1.5368 |
| 5 | 185–187 | 2.3 | 1.5379 |
| 6 | 187–188 | 0.9 | 1.5365 |
| Bottoms [1] | | 4.8 | 1.5609 |

[1] Flask temperature at end of distillation: 300° C.

Cuts 2 to 6 inclusive consisted of isomeric phenylbutenes. Oxidation of a portion of cut 2 with acidic potassium permanganate yielded a mixture of benzaldehyde and benzoic acid. Hydrogenation of the remainder of cut 2 plus all of cut 3 yielded isobutylbenzene which was characterized by its physical properties and by the preparation of its diacetamino derivative; no evidence of the presence of secbutylbenzene could be found. It may, therefore, be concluded that the major constituent of the product of the dehydrochlorination of the β-chlor-t-butylbenzene (or, as it is also known, 1-chloro-2-methyl-2-phenylpropane) is β,β-dimethylstyrene (also called 2-methyl-1-phenylpropene-1).

We claim as our invention:

1. A process for treating an aralkyl halide, the alkyl group of which contains more than one carbon atom, to produce an arylalkene therefrom which comprises heating said aralkyl halide in the presence of a dilute aqueous solution of an acid-acting inorganic compound containing less than 5% by weight of said compound.

2. A process for treating an aralkyl halide, the alkyl group of which contains more than one carbon atom, to produce an arylalkene therefrom which comprises heating said aralkyl halide with an aqueous solution of a mineral acid containing less than 5% by weight of said acid.

3. A process for treating an aralkyl halide, the alkyl group of which contains more than one carbon atom, to produce an arylalkene therefrom which comprises heating said aralkyl halide with an aqueous solution of a halogen acid of less than 5 per cent by weight concentration.

4. A process for treating an aralkyl halide, the alkyl group of which contains more than one carbon atom, to produce an arylalkene therefrom which comprises heating said aralkyl halide with an aqueous solution of an acid-acting salt containing less than 5% by weight of said salt.

5. A process for the production of a phenylbutene which comprises treating 1-chloro-2-methyl-2-phenyl-propane at elevated temperatures with a predominantly aqueous acidic hydrolyzing agent.

6. A process for the dehydrohalogenation of aralkyl halides containing more than one carbon atom in the alkyl group which comprises heating said aralkyl halide at a temperature of from about 150° C. to about 350° C. in the presence of a dilute aqueous solution of an acid-acting inorganic compound containing less than 5% by weight of said compound and recovering an arylalkene from the resultant products.

7. A process for the dehydrohalogenation of aralkyl halides containing more than one carbon atom in the alkyl group which comprises heating said aralkyl halide in the presence of a dilute aqueous solution of an acid-acting inorganic compound containing less than 5% by weight of said compound at a temperature of from about 150° C. to about 350° C. under sufficient pressure to substantially prevent volatilization of said aralkyl halide and said aqueous solution and recovering an arylalkene from the resultant products.

8. A process which comprises treating 1-chloro-2-methyl-2-phenyl-propane with a dilute aqueous solution of an acid-acting inorganic compound containing less than 5% by weight of said compound at a temperature of from about 150° C. to about 350° C. and recovering phenyl butene from the resultant products.

LOUIS SCHMERLING.
VLADIMIR N. IPATIEFF.